(12) United States Patent
Macleod et al.

(10) Patent No.: US 8,314,047 B2
(45) Date of Patent: *Nov. 20, 2012

(54) PREPARATION OF DESULPHURISATION MATERIALS

(75) Inventors: Norman Macleod, Hartlepool (GB); Antonio Chica Lara, Valencia (ES); Avelino Corma Canos, Valencia (ES); Yonhy Saavedra Lopez, Vallada (ES)

(73) Assignee: Johnson Matthey PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/922,347

(22) PCT Filed: Feb. 25, 2009

(86) PCT No.: PCT/GB2009/050191
§ 371 (c)(1),
(2), (4) Date: Sep. 13, 2010

(87) PCT Pub. No.: WO2009/112856
PCT Pub. Date: Sep. 17, 2009

(65) Prior Publication Data
US 2011/0014103 A1    Jan. 20, 2011

(30) Foreign Application Priority Data
Mar. 12, 2008  (GB) .................................. 0804572.6

(51) Int. Cl.
*B01J 23/60*  (2006.01)
*B01D 53/48*  (2006.01)
(52) U.S. Cl. .................................. 502/329; 423/244.02
(58) Field of Classification Search .................. 423/220; 502/176
See application file for complete search history.

(56) References Cited

U.S. PATENT DOCUMENTS

| | | | |
|---|---|---|---|
| 4,233,276 A * | 11/1980 | D'Souza et al. | 423/230 |
| 4,690,806 A | 9/1987 | Schorfheide | |
| 4,762,817 A | 8/1988 | Logsdon et al. | |
| 4,876,402 A | 10/1989 | Logsdon et al. | |
| 5,116,587 A * | 5/1992 | Pinnavaia et al. | 423/244.02 |
| 5,266,188 A | 11/1993 | Kukes et al. | |
| 5,741,947 A * | 4/1998 | Wolf et al. | 568/618 |
| 5,776,331 A | 7/1998 | Khare et al. | |
| 5,785,938 A * | 7/1998 | Pinnavaia et al. | 423/244.01 |
| 5,972,835 A | 10/1999 | Gupta | |
| 6,042,798 A | 3/2000 | Masuda et al. | |

(Continued)

FOREIGN PATENT DOCUMENTS

EP    0 317 975 A2    5/1989

(Continued)

OTHER PUBLICATIONS

Cavani et al., "Hydrotalcite-type Anionic Clays: Preparation, Properties and Applications," *Catalysis Today*, 11 (1991), pp. 173-301.

*Primary Examiner* — Stanley Silverman
*Assistant Examiner* — Justin Bova
(74) *Attorney, Agent, or Firm* — RatnerPrestia

(57) ABSTRACT

A process for the preparation of a desulfurization material includes:
(i) forming a zinc/aluminium hydrotalcite composition, and
(ii) calcining the composition to form a zinc oxide/alumina material,
in which one or more nickel compounds are included in the hydrotalcite formation step, and/or are impregnated onto the hydrotalcite composition and/or the calcined zinc oxide/alumina material, and the resulting composition dried and recovered.

17 Claims, 1 Drawing Sheet

U.S. PATENT DOCUMENTS

| | | | |
|---|---|---|---|
| 6,071,433 | A | 6/2000 | Bhattacharyya |
| 6,274,533 | B1 | 8/2001 | Khare |
| 6,350,422 | B1 | 2/2002 | Khare et al. |
| 6,428,761 | B1 | 8/2002 | Shore et al. |
| 6,429,170 | B1 | 8/2002 | Dodwell |
| 6,656,877 | B2 | 12/2003 | Sughrue et al. |
| 6,864,215 | B2 | 3/2005 | Dodwell et al. |
| 6,887,445 | B2 | 5/2005 | Braga et al. |
| 6,930,074 | B2 | 8/2005 | Khare et al. |
| 6,951,635 | B2 | 10/2005 | Gangwal et al. |
| 7,033,972 | B2 | 4/2006 | Shikada et al. |
| 7,268,097 | B2 | 9/2007 | Katsuno et al. |
| 7,578,986 | B2 | 8/2009 | Hampden-Smith et al. |
| 7,749,376 | B2 | 7/2010 | Turbevillle et al. |
| 7,837,964 | B2 | 11/2010 | Wessel et al. |
| 7,842,645 | B2 | 11/2010 | Kim et al. |
| 7,897,538 | B2 | 3/2011 | Landau et al. |
| 2002/0043484 | A1 | 4/2002 | Khare |
| 2002/0147103 | A1 | 10/2002 | Ruettinger et al. |
| 2003/0032555 | A1 | 2/2003 | Dodwell |
| 2003/0114299 | A1 | 6/2003 | Khare |
| 2003/0166465 | A1 | 9/2003 | Khare |
| 2004/0048743 | A1 | 3/2004 | Malandra et al. |
| 2004/0121906 | A1 | 6/2004 | Gislason et al. |
| 2004/0151646 | A1 | 8/2004 | Scranton, Jr. |
| 2006/0081499 | A1 | 4/2006 | Khare |

FOREIGN PATENT DOCUMENTS

| | | |
|---|---|---|
| EP | 1 192 981 A1 | 4/2002 |
| EP | 1 224 970 A1 | 7/2002 |
| EP | 1 270 069 A1 | 1/2003 |
| JP | 2006-225615 A | 8/2006 |
| SU | 959821 | 9/1982 |

\* cited by examiner

PREPARATION OF DESULPHURISATION MATERIALS

CROSS-REFERENCE TO RELATED APPLICATIONS

This application is the U.S. National Phase application of PCT International Application No. PCT/GB2009/050191, filed Feb. 25, 2009, and claims priority of British Patent Application No. 0804572.6, filed Mar. 12, 2008, the disclosures of both of which are incorporated herein by reference in their entirety for all purposes.

FIELD OF THE INVENTION

This invention relates to a method for synthesising desulphurisation materials, in particular nickel, on mixed zinc oxide-alumina supports.

BACKGROUND OF THE INVENTION

Nickel/zinc oxide/alumina containing desulphurisation materials have been proposed previously for a variety of desulphurisation applications.

SU959821 discloses a catalyst for the desulphurisation of gases, comprising 0.6-5.0% wt nickel oxide, 5.4-10.0% wt copper oxide, 5-16% wt aluminium oxide and the remainder zinc oxide. The gases that may be desulphurised using this material were stated to be natural gases, gases produced during the refining and cracking of crude oil, and also process gases containing $H_2$, CO and $CO_2$. The catalysts were prepared by combining zinc oxide, copper oxide, basic nickel carbonate and aluminium oxide in an ammonium carbonate solution, and ageing the resultant mixture at temperatures in the range 45-85° C. The resultant mass was dried at 100-110° C. and calcined at 350-400° C.

EP1224970 discloses a catalyst for deep desulphurisation of a mineral oil corresponding to kerosene, comprising 5 to 25% by weight nickel oxide, 30 to 70% by weight zinc oxide, and aluminium oxide. The process for producing the deep desulphurisation catalyst comprised mixing a basic substance with each of an aqueous solution of a nickel salt and an aqueous solution of a zinc salt or with a mixed aqueous solution thereof to form precipitates separately or simultaneously, and mixing the precipitates with aluminium oxide or an aluminium oxide precursor, followed by shaping and calcining.

U.S. Pat. No. 6,274,533 discloses sorbent systems for the desulfurization of cracked-gasoline or diesel fuels comprising a reduced bimetallic promoter formed of at least two metals selected from the group consisting of nickel, cobalt, iron, manganese, copper, zinc, molybdenum, tungsten, silver, tin, antimony and vanadium on a particulate support comprising zinc oxide. The preferred bimetallic promoter was a mixture of nickel and cobalt on a particulate support comprised of zinc oxide, silica and alumina. The methods disclosed for the preparation of these materials included addition of bimetallic promoter compounds to the support components prior to drying and calcining, or impregnation of dried and calcined support particulates with a solution that contains the elemental metals, metal oxides or metal-containing compounds of the selected promoter system. The preferred preparative route comprised the steps of: (a) admixing zinc oxide, silica and alumina so as to form a mixture in the form of a wet mix, dough, paste or slurry; (b) particulating the resulting mix to form granules, extrudates, tablets, pellets, spheres or microspheres; (c) drying the resulting particulate; (d) calcining the dried particulate; (e) impregnating the resulting calcined particulate with bimetallic promoter; (f) drying the impregnated particulate; (g) calcining the resulting dried particulate; and (h) reducing the calcined particulate product of (g) with a suitable reducing agent so as to produce a particulate composition having a substantially reduced bimetallic promoter content therein.

SUMMARY OF THE INVENTION

It is believed that the Ni component catalyses hydrodesulphurisation of any organo-sulphur species in the feed, whilst the ZnO absorbs the $H_2S$ produced (by reaction to form ZnS). Whereas the nickel is active in reduced form, and it is possible to supply a pre-reduced and passivated material to the user, it is common practice to provide an oxidic material to the user, who performs a reduction step in-situ.

The above methods, while effective do not always provide desulphurisation materials that are robust, active and readily reduced in situ. We have found that if a Zn—Al hydrotalcite material is used as the basis for the support, the resulting desulphurisation materials have excellent and superior properties to the materials made by other routes.

Accordingly, the invention provides a process for the preparation of a desulphurisation material comprising steps of:
 (i) forming a zinc/aluminium hydrotalcite composition, and
 (ii) calcining the composition to form a zinc oxide/alumina material,
in which one or more nickel compounds are included in the hydrotalcite formation step, and/or, are impregnated onto the hydrotalcite composition and/or the calcined zinc oxide/alumina material and the resulting composition dried and recovered.

BRIEF DESCRIPTION OF THE DRAWINGS

The invention is further described by reference to the following figures in which.

DETAILED DESCRIPTION OF THE INVENTION

Figure 1:
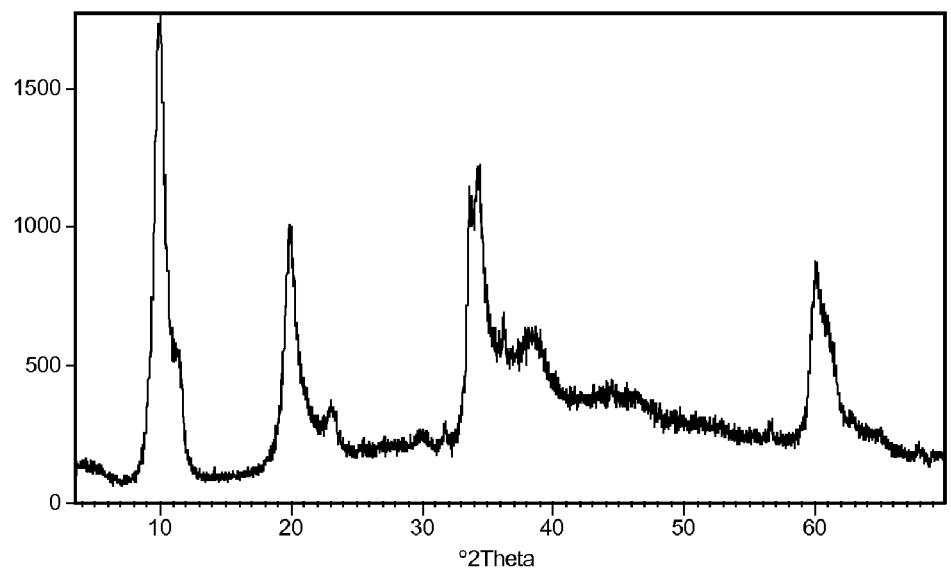
FIG. 1 is a powder x-ray diffraction pattern of the sample in Example 1 prior to calcination.

The term "zinc/aluminium hydrotalcite composition" is meant to encompass an anionic clay having a crystal structure that consists of positively charged layers built up of a combination of Zn and Al hydroxides between which there are anions and water molecules. Hydrotalcite itself is an example of a naturally occurring anionic clay, in which Mg and Al are the metal hydroxides and carbonate is the predominant anion present. The hydrotalcite compositions therefore may be of formulae $[M^{2+}_{1-x}M^{3+}_{x}(OH)_a]^{b+}[A^{n-}]_{b/n-}$ where, $M^{2+}$ is Zn or Zn partially replaced by another divalent metal. $M^{3+}$ is Al, A may be $CO_3$, $NO_3$, OH, $CH_3CO_2$ or another suitable anion and x may be 0.1 to 0.5. No other phases of zinc or aluminium are desirably present. The hydrotalcite composition may subsequently be converted by calcination to provide a mixed $ZnO/Al_2O_3$ support with improved properties, primarily high surface area and high dispersion of the ZnO component.

The reducible Ni component can be incorporated into the desulphurisation material either during the hydrotalcite formation process, or subsequently by impregnation onto the hydrotalcite composition and/or the calcined mixed ZnO/$Al_2O_3$ support.

Similarly, additional promoters such as Cu, Mg, Na, Li and/or, K compounds can also be incorporated either during the hydrotalcite formation process, or subsequently by impregnation onto the hydrotalcite composition and/or the calcined mixed ZnO/$Al_2O_3$ support.

The high surface area of the ZnO/$Al_2O_3$ produced via this method allows for any supported components added to be highly dispersed over the support surface. This high dispersion improves utilisation of the costly active metal and allows the required level of activity to be obtained with lower levels of these components.

The Zn—Al hydrotalcite material may be formed using co-precipitation methods employing soluble Zn and Al compounds or by hydrothermal treatment of mixtures of milled or un-milled solid zinc and aluminium compounds. For example, mixtures of Zn and Al metal oxides, hydroxides, carbonates, and hydroxy-carbonates maybe combined, in the presence or absence of a solvent, and heated to form hydrotalcite compositions.

In a preferred embodiment, the zinc/aluminium hydrotalcite composition is prepared by steps comprising:
  (i) forming an aqueous solution of Zn and Al salts with a Zn:Al molar ratio in the range 9:1 to 1:1,
  (ii) treating the solution with an alkaline precipitant such that a precipitate is formed,
  (iii) ageing the precipitate at a temperature in the range 10 to 100° C., and
  (iv) recovering the aged material.

The Zn and Al salts may be selected from chlorides, nitrates, sulphates, oxalates and acetates, and mixtures thereof although preferably the salts are Zn nitrate and Al nitrate. The molar ratio of Zn to Al is preferably about 4:1. Typically the Zn and Al solution will be acidic, i.e. have a pH<7.0.

The alkaline precipitant may be selected from the hydroxide, carbonate or hydrogen carbonate of sodium or potassium, or mixtures of these. Alternatively the alkaline precipitant may be ammonium hydroxide or an organic base, although this is less preferred.

Where sodium or potassium alkaline precipitants are used, it is desirable that sodium nitrate or potassium nitrate is included in the alkaline precipitant. It is believed that this assists in the formation of the hydrotalcite-like structure. The amount of sodium or potassium nitrate may be varied e.g. from about 0.5 to 2.0 moles of sodium or potassium nitrate per mole of alkaline precipitant.

The concentration of the various components is typically in the range 0.1 to 5 moles/liter and may be selected appropriately to suit the equipment and scale of operation using knowledge known to those skilled in the art.

Although the alkaline precipitant may be added to the mixed zinc and aluminium salt solution, or vice-versa, it is desirable to combine the solutions simultaneously in a precipitation reactor which may be rapidly stirred and then to pass the precipitated material to a separate ageing vessel. Hence in a preferred embodiment an aqueous solution of Zn and Al salts is mixed continuously with an aqueous solution of alkaline precipitant and sodium or potassium nitrate. Preferably the precipitation is performed at a pH in the range 5-14, more preferably 5-7. It is preferred that the pH during precipitation is maintained at a constant value (±0.2 pH units), e.g. by controlling the addition of the Zn/Al and alkaline solutions to the precipitation reactor. Furthermore, the speed of stirring and the temperature at which the precipitation is performed may be increased or reduced during precipitation to influence the properties of the resulting material.

The precipitated mixture in the form of a gel or slurry is preferably aged for between 0.5 and 48 hours, more preferably between 1 and 24 hours. The ageing period improves the homogeneity of the hydrotalcite material. The ageing may be carried out at ambient or elevated temperature, e.g. in the range 10-100° C. Preferably the ageing step is performed at a temperature in the range 20-90° C., more preferably 40 to 80° C.

Part of the Zn may be replaced with Mg in the hydrotalcite precursor. This may be achieved by incorporating a magnesium compound, such as a nitrate, sulphate, chloride, acetate or oxalate, or hydroxide or carbonate during the hydrotalcite formation process. Preferably the Mg content of the desulphurisation material is in the range 0.5 to 10%, more preferably 2-7% by weight. Accordingly, in one embodiment, a magnesium compound is mixed with the aqueous solution of Zn and Al salts in an amount sufficient to produce a desulphurisation material with a Mg content in the range 0.5 to 10% by weight.

The active catalyst requires a Ni compound to be incorporated into the catalyst. As stated above, the Ni component can be incorporated either during the hydrotalcite formation process, and/or subsequently by impregnation onto the hydrotalcite composition and/or the calcined mixed ZnO/$Al_2O_3$ support. Preferably the Ni is included either in the hydrotalcite formation step or by impregnation of the calcined ZnO/$Al_2O_3$ support. Preferably the Ni content of the desulphurisation material is in the range 0.2 to 10%, more preferably 0.5-7.5%, most preferably 1-5% by weight. Hence in one embodiment, a nickel compound, such as a nitrate, sulphate, chloride, acetate, oxalate, hydroxide or carbonate, is mixed with the aqueous solution of Zn and Al salts in an amount sufficient to produce a desulphurisation material with a Ni content in the range 0.2 to 10% by weight.

In addition to the Ni component, it may be desirable to include one or more reducible metals as promoters. A particularly preferred reducible metal promoter is copper. Therefore in a preferred embodiment, the desulphurisation material comprises nickel and copper. Again, the Cu component can be incorporated either during the hydrotalcite formation process, or subsequently by impregnation onto the hydrotalcite composition and/or the calcined mixed ZnO/$Al_2O_3$ support. Preferably the Cu is included either during the hydrotalcite formation step or by impregnation of the mixed ZnO/$Al_2O_3$ support. Preferably the Cu content of the desulphurisation material is in the range 0.2 to 10%, more preferably 0.5-7.5%, most preferably 1-5% by weight. Accordingly, in one embodiment, a copper compound such a nitrate, sulphate, chloride, acetate or oxalate, or hydroxide, hydroxy-carbonate or carbonate, is mixed with the aqueous solution of Zn and Al salts, which may also comprise a magnesium compound, in an amount sufficient to produce a desulphurisation material with a Cu content in the range 0.2 to 10% by weight. The Ni component may be combined with the copper, zinc and aluminium compounds or may be impregnated onto a calcined copper-containing zinc oxide/alumina mixture. Where copper is included, the weight ratio of copper:nickel in the desulphurisation material is preferably in the range 0.8 to 1.2:1.

The resulting hydrotalcite composition may be separated from the combined solutions, by filtration or centrifugation to yield a damp product, which is preferably washed with water to remove traces of soluble salts. The separated composition may then be subjected to heating to dry it and calcining to form an oxidic composition. Before calcination, the hydrotalcite material may be impregnated with one or more compounds of Ni, and if desired one or more promoter compounds.

Drying and calcining may be performed in one or two stages. Drying is typically performed at 40-130° C. Calcination may be performed at 200° C.-750° C. for up to 24 hours, but is preferably performed at 250-550° C. over 1-10 hours, e.g. 2 hours.

As stated above, the calcined zinc oxide alumina material may be subjected to one or more steps of impregnation and drying to incorporate the Ni component. Furthermore, it may be desirable to impregnate a material that already contains some Ni introduced in the hydrotalcite formation step.

The calcined material may be impregnated with an aqueous solution of one or more soluble nickel compounds, such as a nitrate, sulphate, chloride, acetate or oxalate, and dried such that the Ni content of the recovered dried impregnated zinc oxide/alumina composition is in the range 0.2 to 10% by weight, preferably 0.5-7.5%, more preferably 1-5% by weight.

In addition, the calcined material, before or after incorporation of the Ni component, may be impregnated with an aqueous solution of one or more copper compounds, such as the nitrate, sulphate, chloride acetate or oxalate, and dried such that the Cu content of the recovered dried impregnated zinc oxide/alumina composition is in the range 0.2 to 10%, preferably 0.5-7.5%, more preferably 1-5% by weight.

Alternatively, the calcined zinc oxide alumina material may be co-impregnated with a solution comprising both Ni and Cu compounds, and dried.

Similarly, the recovered zinc oxide/alumina composition, before or after incorporation of the Ni component, may be subjected to one or more further steps of impregnation and drying with one or more non-reducible promoter compounds of promoter metals selected from the group consisting of Li, Na and K. Appropriate compounds include the nitrate, sulphate, chloride, actetate, oxalate, hydroxide or carbonate salts. If included, the levels of these compounds in the desulphurisation material is preferably in the range 0.5 to 5.0% by weight.

The impregnated and dried material may also be subjected to calcination using the above conditions at a temperature in the range 200-750° C., to render the desulphurisation material as a mixture of Ni, Zn and Al oxides, which may contain other oxides including Mg oxide and Cu oxide.

An especially preferred calcined desulphurisation material consists of nickel oxide, promoted with Cu oxide and optionally Na or K oxide on a zinc oxide/alumina support, in which part of the zinc oxide may be replaced with magnesium oxide, wherein the contents of the oxides are; NiO 1-5% by weight, CuO 1-5% by weight, $Al_2O_3$ 5-20% by weight, $Na_2O$ or $K_2O$ 0 to 5% by weight, MgO 0-10% by weight, and the remainder zinc oxide.

The desulphurisation material may, if desired, be formed into shaped units suitable for the process for which the material is intended, using methods known to those skilled in the art. The shaped units may be spheres, pellets, cylinders, rings, or multi-holed pellets, which may be multi-lobed or fluted, e.g. of cloverleaf cross-section.

The forming process may be one of pelleting, granulating or extruding the composition using known methods. Granulation is preferred. A suitable binder may also be included, such as a calcium aluminate cement. Additionally, a binder clay such as an attapulgite clay may also be included.

To render the desulphurisation material active, the Ni component should be reduced in a reducing gas stream in order to convert the Ni to elemental form. Known methods for causing reduction of the Ni component may be used. The reducing gas stream may be the process fluid to be desulphurised, where it contains hydrogen and/or carbon monoxide. Preferably, the desulphurisation material is activated in a separate activation step using a hydrogen-containing gas stream, which may be a synthesis gas or another hydrogen containing gas. The activation is normally performed at elevated temperature, e.g. reduction may be accomplished using pure $H_2$ at 450° C. for 3 hours.

The desulphurisation materials obtained by the process of the present invention may be applied to the desulphurisation of a wide range of sulphur containing liquids and gases including hydrocarbons such as natural gas, liquid natural gas, natural gas liquids, kerosene, cracked naphtha, diesel fuels; carbon dioxide, carbon monoxide, hydrogen and mixtures of these, including synthesis gas mixtures with a wide range of compositions. In particular, the desulphurisation materials may be applied to gaseous hydrocarbons or synthesis gas mixtures. In use, the process for the desulphurisation of a gas will comprise contacting the liquid or gaseous process fluid, in the presence of hydrogen, with a desulphurisation material, for example a fixed bed of a particulate desulphurisation material, prepared according to the present invention, at temperatures in the range 10-450° C. and at pressures in the range 1-50 bar g. Hydrogen is required in use, and may typically be provided in the streams at a minimum level in the range 0.1-5% volume. It may be desirable, in order to deep desulphurise the process fluid, to introduce a bed of particulate zinc oxide hydrogen sulphide absorbent downstream of the desulphurisation material prepared according to the present invention, in order to capture any slipped hydrogen sulphide.

The desulphurisation materials obtained according to the process of the present invention are able to remove a wide range of sulphur compounds including hydrogen sulphide, carbonyl sulphide, carbon disulphide, dialkyl sulphides such as dimethyl sulphide, dialkyl disulphides such as diethyl disulphide and thiophenic species.

EXAMPLES

The invention will now be further described by reference to the following examples.

Example 1

Hydrotalcite Synthesis

A first solution containing mixed metal was prepared by dissolving 79.0 g of zinc nitrate hexahydrate and 24.9 g of aluminium nitrate nonahydrate in 228 ml of deionised water. A second basic solution was prepared by dissolving 37.6 g of sodium nitrate and 20.6 g sodium hydroxide in 274 ml of deionised water. These solutions were then mixed at room temperature using a syringe pump at a rate of 2 mL/min, under vigorous stirring. The final pH was 5.7. The resulting gel was passed to a polypropylene bottle and heated in an oven at 60° C. for 18 h. Finally the resulting solid was filtered, washed with deionized water and oven-dried at 60° C. overnight. Powder x-ray diffraction was carried out in order to confirm that a hydrotalcite structure was obtained (FIG. 1).

Figure 2:
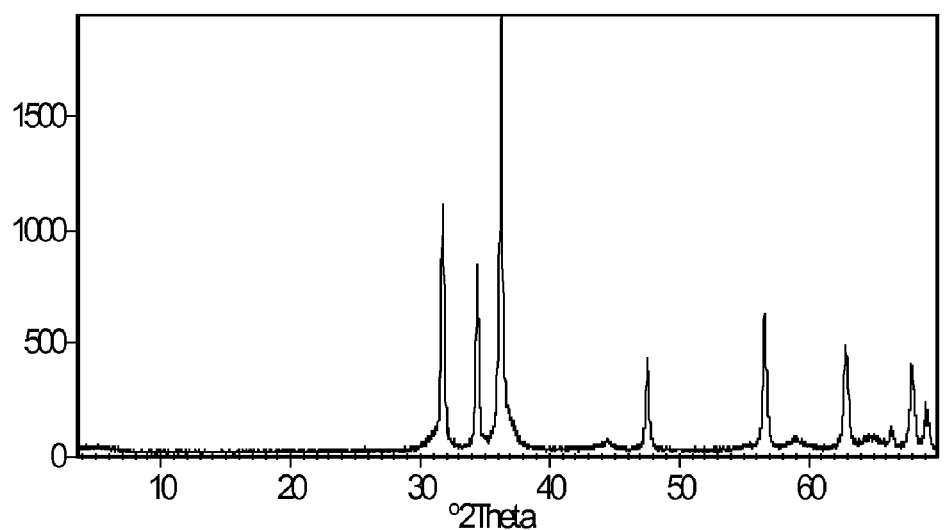
FIG. 2 is an x-ray diffraction pattern of the sample in Example 1 after calcination.

The dried Zn hydrotalcite was calcined at 500° C. for 2 hours. After calcination, the hydrotalcite structure disappeared and a mixture of oxides of Zn (ZnO) and Al ($Al_2O_3$) was identified by XRD (FIG. 2).

The BET surface area of the solid before and after calcination was 100 m²/g and 45 m²/g respectively. The nominal ZnO and $Al_2O_3$ contents were 86 wt % and 14 wt % respectively.

Example 2

Ni Incorporated During Hydrotalcite Synthesis

The procedure outlined in Example 1 was repeated with the exception that the required quantity of nickel nitrate hexahydrate was added to the mixed metal solution so as to yield 3 wt % Ni in the finished product. Following calcination the resulting powder was pelletised and subsequently crushed and sieved to yield 0.2-0.6 mm particle size range.

This material was then tested in a high-pressure microreactor system at 35 barg, 350° C., in a natural gas feed containing 2.0 vol % $H_2$, 3.5 vppm carbonyl sulphide (COS), 3.8 vppm dimethyl sulphide (DMS), 4.3 vppm thiophene and at a space velocity of 30,000 $h^{-1}$. Prior to testing the sample was reduced in pure $H_2$ at 450° C. for 3 hours. Product analysis was performed using a Varian 3800 Gas Chromatograph in conjunction with a Seivers Instruments SCD analyzer. Under these conditions, at steady state, full conversion of COS and DMS was achieved. The corresponding thiophene conversion averaged 76%.

Example 3

Ni and Cu Incorporated During Hydrotalcite Synthesis

The procedure outlined in Example 1 was repeated with the exception that the required quantities of nickel nitrate hexahydrate and copper nitrate hemypentahydrate were added to the mixed metal solution so as to yield 3 wt % Ni and 3 wt % Cu (as metals) in the finished product. Following calcination the resulting powder was pelletised and subsequently crushed and sieved to yield 0.2-0.6 mm particle size range.

This material was then tested in a high-pressure microreactor system at 35 barg, 350° C., in a natural gas feed containing 2.0 vol % $H_2$, 3.5 vppm carbonyl sulphide (COS), 3.8 vppm dimethyl sulphide (DMS), 4.3 vppm thiophene and at a space velocity of 30,000 $h^{-1}$. Prior to testing the sample was reduced in pure $H_2$ at 450° C. for 3 hours. Under these conditions, at steady state, full conversion of COS and DMS was achieved. The corresponding thiophene conversion averaged 97%. The $H_2S$ slip level was below 0.1 vppm.

Example 4

Ni and Cu Incorporated by Sequential Impregnation of the Calcined Zinc Oxide Alumina Material The procedure outlined in Example 1 was repeated to produce a ZnO—$Al_2O_3$ mixed oxide support. In this case however the initial hydrotalcite calcination temperature was 400° C.

This material was subsequently impregnated with Cu using a standard incipient wetness technique employing copper nitrate solution. The resulting solid was then dried at 60° C. for 2 hours. Finally Ni was incorporated using the same incipient wetness procedure, this time using a nickel nitrate solution. Following a further period of drying at 60° C. for 2 hours, the material was calcined at 400° C. The metal loadings in this case were 3 wt % Ni and 3 wt % Cu (as metals). Following calcination the resulting powder was pelletised and subsequently crushed and sieved to yield 0.2-0.6 mm particle size range.

This material was then tested in a high-pressure microreactor system at 35 barg, 350° C., in a natural gas feed containing 2.0 vol % $H_2$, 3.5 vppm carbonyl sulphide (COS), 3.8 vppm dimethyl sulphide (DMS), 4.3 vppm thiophene and at a space velocity of 30,000 $h^{-1}$. Prior to testing the sample was reduced in pure $H_2$ at 450° C. for 3 hours. Under these conditions, at steady state, full conversion of COS and DMS was achieved. The corresponding thiophene conversion averaged 96%. The $H_2S$ slip level was below 0.1 vppm.

Example 5

Ni and Cu Incorporated by Simultaneous Impregnation of the Calcined Zinc Oxide Alumina Material The procedure outlined in Example 1 was repeated to produce a ZnO—$Al_2O_3$ mixed oxide support.

This material was subsequently co-impregnated using a standard incipient wetness technique employing a mixed metal nitrate solution containing both Ni and Cu. The resulting solid was then dried at 60° C. for 2 hours and calcined at 500° C. The metal loadings were in this case 3 wt % Ni and 3 wt % Cu (as metals). Following calcination the resulting powder was pelletised and subsequently crushed and sieved to yield 0.2-0.6 mm particle size range.

This material was then tested in a high-pressure microreactor system at 35 barg, 350° C., in a natural gas feed containing 2.0 vol % $H_2$, 3.5 vppm carbonyl sulphide (COS), 3.8 vppm dimethyl sulphide (DMS), 4.3 vppm thiophene and at a space velocity of 30,000 $h^{-1}$. Prior to testing the sample was reduced in pure $H_2$ at 450° C. for 3 hours. Under these conditions, at steady state, full conversion of COS and DMS was achieved. The corresponding thiophene conversion averaged 84%. The $H_2S$ slip level was below 0.02 vppm.

Example 6

Ni and Cu Incorporated by Sequential Impregnation onto a MgO—ZnO—$Al_2O_3$ Support The procedure outlined in Example 1 was again repeated, with the exception that in this case magnesium nitrate was also added to the initial mixed metal solution. The hydrotalcite intermediate formed in this case was calcined at 500° C. in order to produce a MgO—ZnO—$Al_2O_3$ mixed oxide support. The Mg level following calcination was 5 wt %. The BET surface area of the solid following calcinations was 48 m²/g.

This material was subsequently impregnated with Cu using a standard incipient wetness technique employing copper nitrate solution. The resulting solid was then dried at 60° C. for 2 hours. Finally Ni was incorporated using the same incipient wetness procedure, this time using a nickel nitrate solution. Following a further period of drying at 60° C. for 2 hours, the material was calcined at 500° C. The metal loadings were in this case 3 wt % Ni and 3 wt % Cu (as metals). Following calcination the resulting powder was pelletised and subsequently crushed and sieved to yield 0.2-0.6 mm particle size range.

This material was then tested in a high-pressure microreactor system at 35 barg, 350° C., in a natural gas feed containing 2.0 vol % $H_2$, 3.5 vppm carbonyl sulphide (COS), 3.8 vppm dimethyl sulphide (DMS), 4.3 vppm thiophene and at a space velocity of 30,000 h$^{-1}$. Prior to testing the sample was reduced in pure H$_2$ at 450° C. for 3 hours. Under these conditions, at steady state, full conversion of COS and DMS was achieved. The corresponding thiophene conversion averaged 97%. The H$_2$S slip level was below 0.02 vppm.

A further desulphurisation test was carried out on this material at 35 barg, 350° C., in a natural gas feed containing 2.0 vol % H$_2$, 34.6 vppm carbonyl sulphide (COS), 36.7 vppm dimethyl sulphide (DMS), 45.9 vppm thiophene and at a space velocity of 30,000 h$^{-1}$. Under these conditions, at steady state, full conversion of COS and DMS was achieved. The corresponding thiophene conversion averaged 86%. The H$_2$S slip level was below 0.02 vppm.

Example 7

Na Incorporated by Impregnation of the Calcined Zinc Oxide Alumina Material Containing Ni and Cu The procedure outlined in Example 4 was repeated to produce a ZnO—Al$_2$O$_3$ mixed oxide support containing 3 wt % Ni and 3 wt % Cu (as metals).

This material was calcined at 400° C. Following calcination the material was impregnated with Na using a standard incipient wetness impregnation technique employing sodium nitrate solution at a concentration sufficient to provide 0.5% wt Na (as metal) in the dried and calcined material. The resulting solid was then dried at 60° C. for 2 hours and subsequently calcined at 400° C. The metal loadings achieved in this case were 3 wt % Ni and 3 wt % Cu and 0.5% wt Na (as metals). Following calcination, the resulting powder was pelletised and subsequently crushed and sieved to yield 0.2-0.6 mm particle size range.

This material was tested in a high-pressure microreactor system at 35 barg, 350° C., in a natural gas feed containing 2.0 vol % H$_2$, 3.5 vppm carbonyl sulphide (COS), 3.8 vppm dimethyl sulphide (DMS), 4.3 vppm thiophene and at a space velocity of 30,000 h$^{-1}$. Prior to testing the sample was reduced in pure H$_2$ at 450° C. for 3 hours. Under these conditions, at steady state, full conversion of COS and DMS was achieved. The corresponding thiophene conversion averaged 86%. The H$_2$S slip level was below 0.1 vppm.

The above results show that these materials are effective desulphurisation agents even when operated at high space velocities and with high levels of sulphur in the feeds (up to 100 ppm).

The invention claimed is:

1. A process for the preparation of a desulfurization material for use in the desulfurization of a process fluid in the presence of hydrogen comprising:
   (i) forming a hydrotalcite composition comprising zinc and aluminium, and
   (ii) calcining the composition to form an oxidic material comprising zinc oxide and alumina,
in which one or more nickel compounds are included in the hydrotalcite formation step and/or are impregnated onto the hydrotalcite composition and/or the calcined oxidic material, and the resulting composition dried and recovered to produce the desulfurization material with a Ni content in the range 0.2 to 10% by weight, wherein the hydrotalcite composition is prepared by steps comprising:
   (i) forming a first aqueous solution of Zn and Al salts with a Zn:Al molar ratio in the range 9:1 to 1:1,
   (ii) mixing the first aqueous solution with a second aqueous solution comprising an alkaline precipitant and a nitrate of sodium or potassium such that a precipitate is formed, wherein the alkaline precipitant is selected from the hydroxide, carbonate or hydrogen carbonate of sodium or potassium, or mixtures of these, and wherein the amount of sodium or potassium nitrate is in the range 0.5 to 2.0 moles per mole of alkaline precipitant,
   (iii) ageing the precipitate at a temperature in the range 10 to 100° C., and
   (iv) recovering the aged material.

2. A process according to claim 1 wherein the Zn and Al salts are selected from the group consisting of chlorides, nitrates, sulphates, oxalates and acetates.

3. A process according to claim 1 wherein the Zn and Al salts are both nitrates.

4. A process according to claim 1 wherein the precipitation is performed at a pH in the range 5-14.

5. A process according to claim 1 wherein the ageing step is continued for between 0.5 and 48 hours.

6. A process according to claim 1 wherein the ageing step is performed at a temperature in the range 40 to 80° C.

7. A process according to claim 1 wherein a magnesium compound is mixed with the first aqueous solution in an amount sufficient to produce the desulfurization material with a Mg content in the range 0.5 to 10% by weight.

8. A process according to claim 1 wherein the one or more nickel compounds is mixed with the first aqueous solution.

9. A process according to claim 1 wherein a copper compound is mixed with the first aqueous solution in an amount sufficient to produce the desulfurization material with a Cu content in the range 0.2 to 10% by weight.

10. A process according to claim 1 wherein one or more copper compounds are impregnated onto the hydrotalcite composition in an amount sufficient to produce the desulfurization material with a Cu content in the range 0.2 to 10% by weight.

11. A process according to claim 1 wherein the one or more nickel compounds are impregnated onto the hydrotalcite composition.

12. A process according to claim 1 wherein the calcined material is impregnated with a third aqueous solution of one or more soluble copper compounds and dried, such that the Cu content of the recovered dried impregnated oxidic material is in the range 0.2 to 10% by weight.

13. A process according to claim 1 wherein the one or more nickel compounds are soluble and the calcined material is impregnated with a third aqueous solution of the one or more soluble nickel compounds and dried.

14. A process according to claim 1 wherein the calcination of the Zn—Al hydrotalcite composition or the calcination of the impregnated and dried composition is performed at a temperature in the range 200-750° C.

15. A process according to claim 1 wherein the recovered oxidic material is subjected to one or more further steps of impregnation with a third aqueous solution of the one or more nickel compounds and/or copper compounds and drying.

16. A process according to claim 1 wherein the recovered oxidic material is subjected to one or more further steps of impregnation with a third aqueous solution of one or more promoter compounds comprising promoter metals selected from the group consisting of Na, Li and K, and drying.

17. A process according to claim 1 wherein the first aqueous solution of Zn and Al salts is simultaneously combined with the second aqueous solution comprising an alkaline precipitant and a nitrate of sodium or potassium in a precipitation reactor.

* * * * *